United States Patent [19]

Robinson et al.

[11] Patent Number: 4,775,208
[45] Date of Patent: Oct. 4, 1988

[54] PLANAR WAVEGUIDE MODE CONVERTER DEVICE

[75] Inventors: William C. Robinson, Concord; Norman A. Sanford, Stillriver, both of Mass.

[73] Assignee: Polaroid Corporation, Cambridge, Mass.

[21] Appl. No.: 906,931

[22] Filed: Sep. 15, 1986

Related U.S. Application Data

[63] Continuation-in-part of Ser. No. 871,265, Jun. 6, 1986, abandoned.

[51] Int. Cl.⁴ .......................... G02B 6/10; G02B 5/30
[52] U.S. Cl. .............................. 350/96.14; 350/96.12; 350/96.13; 350/370; 350/374
[58] Field of Search ............... 350/96.11, 96.12, 96.13, 350/96.14, 96.15, 370, 374, 375, 376, 377, 378

[56] References Cited

U.S. PATENT DOCUMENTS

| | | | |
|---|---|---|---|
| 3,837,827 | 9/1974 | Carruthers et al. | 350/96.11 X |
| 3,880,630 | 4/1975 | Izawa | 65/30 |
| 3,923,376 | 12/1975 | Martin | 350/96.12 X |
| 4,203,649 | 5/1980 | Velasco et al. | 350/96.14 |
| 4,220,395 | 9/1980 | Wang et al. | 350/96.12 |
| 4,400,052 | 8/1983 | Alferness et al. | 350/96.12 |
| 4,533,207 | 8/1985 | Alferness | 350/96.14 |
| 4,547,262 | 10/1985 | Spillman, Jr. et al. | 156/659.1 |
| 4,583,817 | 4/1986 | Papuchon | 350/96.14 |
| 4,607,909 | 8/1986 | Sanford | 350/96.14 |
| 4,645,293 | 2/1987 | Yoshida et al. | 350/96.14 |
| 4,685,763 | 8/1987 | Tada et al. | 350/96.14 |
| 4,691,983 | 9/1987 | Kobayashi et al. | 350/96.12 |
| 4,691,984 | 9/1987 | Thaniyavarn | 350/96.14 |
| 4,695,122 | 9/1987 | Ishida et al. | 350/96.12 |
| 4,697,868 | 10/1987 | Thanivavarn | 350/96.12 |
| 4,711,515 | 12/1987 | Alferness | 350/96.14 |
| 4,714,312 | 12/1987 | Thaniyavarn | 350/96.14 |

FOREIGN PATENT DOCUMENTS

| | | | |
|---|---|---|---|
| 54-35781 | 10/1974 | Japan | 350/96.12 X |
| 53-92149 | 1/1977 | Japan | 350/96.12 X |
| 53-76048 | 7/1978 | Japan | 350/96.12 X |
| 57-158616 | 9/1982 | Japan | 350/96.14 |

OTHER PUBLICATIONS

Jackel et al., "Proton Exchange for High-Index Waveguides in LiNbO₃", Appl. Phys. Lett., vol. 41, No. 7, 10/82, pp. 607–608.

Primary Examiner—William L. Sikes
Assistant Examiner—Brian M. Healy
Attorney, Agent, or Firm—Francis J. Caufield

[57] ABSTRACT

A planar waveguide device including metallic electrodes has a buffer layer of reduced ordinary index of refraction formed in a substrate between its waveguide and electrodes. The device is preferably formed by first fabricating the waveguide in an x-or y-cut substrate of crystalline material, subsequently overcoating the substrate, including the waveguide, with a layer of magnesium, oxidizing the magnesium at temperature to form the buffer layer and then laying the electrodes over the buffer layer. Alternatively, the buffer layer may be formed by a proton exchange process.

4 Claims, 2 Drawing Sheets

PLANAR WAVEGUIDE MODE CONVERTER DEVICE

This application is a continuation-in-part of U.S. patent application Ser. No. 871,265, filed 6/6/86, now abandoned.

BACKGROUND OF THE INVENTION

The present invention relates to optical communications and, more particularly, to planar optical waveguide devices for use as components in optical circuits.

Waveguide devices of various types, including some, such as modulators, mode converters, and switches requiring an input of electrical energy for their operation, are needed to direct and control electromagnetic carrier waves in the optical region of the spectrum for conveying information. Waveguide devices of planar construction have been found advantageous for many applications because of their small size, durability, low cost and ease of fabrication. In such planar waveguide devices, the waveguide can be formed as a channel in a planar substrate of crystalline birefringent light propagating material by various methods to raise the index of refraction of a localized portion of the substrate. Commonly used procedures for raising the index of refraction of a light propagating material include ion exchange processes by which, for example, titanium is diffused at high temperature into the material or the material is immersed in a bath of melted benzoic acid. For waveguide devices requiring electrical energy, the energy is applied through electrodes, normally in the form of thin strips of metal deposited on, over or near the waveguide. One problem with the presence of metallic electrodes near the waveguide is that the guided waves are attenuated by the optical absorption of a portion of the energy of the waves in the vicinity of the electrodes.

In order to protect the waveguide from the attenuating influence of the electrodes, one practice has been to deposit over the surface of the substrate, as by a sputter deposition process, a thin dielectric film, for example, about 0.1 micron of silicon dioxide, having an index of refraction lower than that of the waveguide and then to deposit the metallic electrodes onto the dielectric film. The dielectric film must be of high optical quality, that is, it must be free of defects such as impurities or occlusions that define light scattering centers which contribute to the attenuation of guided waves. The dielectric layer must have an index of refraction equal to or less than that of the substrate, must also have a thickness sufficient to prevent the wave energy field from coming into contact with the electrodes, and an electrical conductivity sufficiently low, that is, a resistivity sufficiently high, to prevent current from passing into the substrate when electrical energy is applied at the electrodes.

It is difficult to produce dielectric films of the required quality and electrical conductivity to effectively isolate the waveguide from the metallic electrodes. A high degree of quality control is required to produce films free of defects. This requires providing an ultra-clean environment, employing very pure materials and precisely controlling temperature, humidity and vacuum during the manufacturing process. Slight deviations from optimal conditions result in substantial reductions in the yield of high quality material.

Furthermore, even though crystalline birefringent light propagating material of high purity can be produced for use in waveguide devices, such material still contains trace amounts of impurities, notably iron, which can be photoionized and react with the light propagating through the waveguide. As a result, a space charge near the waveguide accumulates and perturbs the guided modes through the electro-optic effect. Such phenomena are usually classified as optical damage effects.

Additionally, waveguides formed with the foregoing processes tend to have asymmetric modal power distributions with respect to the axis of the waveguide. Due to this asymmetry, the coupling efficiency of light to and from these waveguides is greatly reduced.

Among the objects of the invention, therefore, is to protect optical waves in the waveguide of a planar waveguide device from attenuation by metallic electrodes by forming a buffer layer in the substrate of the planar waveguide device and forming the buffer layer by a process which can be precisely controlled and reliably produces a defect-free buffer layer.

Another object of the invention is to increase conductivity in the region of the substrate near the waveguide to reduce space charge accumulation and substantially reduce optical damage effects.

Other objects and further scope of applicability of the present invention will become apparent from the detailed description to follow taken in conjunction with the accompanying drawings in which like parts are designated by like reference numerals.

SUMMARY OF THE INVENTION

In accordance with the present invention, the problems associated with isolating information-conveying optical carrier waves propagating through waveguides in planar waveguide devices from the attenuation caused by optical absorption of wave energy by metallic electrodes are overcome by providing in the substrate of the waveguide device a buffer layer of reduced index of refraction between the waveguide and the electrodes to optically isolate the waveguide from the electrodes.

Preferably, the buffer layer is formed by applying a layer of magnesium over a substrate of x- or y-cut crystalline birefringent material in which a waveguide has previously been formed and then oxidizing the magnesium at temperature for a predetermined time. Afterwards, the electrodes are deposited as required on the magnesium oxide buffer layer. The MgO buffer layer has been found to facilitate optimizing the action of TE-TM mode conversion devices and to greatly reduce the sensitivity to D.C. bias fields used to force phase match TE-TM modes in such devices.

The buffer layer may alternatively be produced by an ion exchange, or proton exchange, process in a planar substrate of x-cut or y-cut crystalline birefringent material having a waveguide formed substantially parallel to the z-axis as a localized region of raised index of refraction. The ion exchange process actually lowers the ordinary index of refraction of the substrate in a stratum at the surface to define the buffer layer. The buffer layer can be relied on to be uniform and homogeneous as well as having its index of refraction carefully controlled within limits. The proton exchange process involves immersing the substrate in an acid bath such as melted benzoic acid at a prescribed temperature for a predetermined period of time. This permits the thickness of the buffer layer to be controlled precisely by adjusting the temperature and duration of the bath.

In addition to optically isolating the waveguide from the electrodes, the buffer layer, formed with either technique, buries the waveguide below the surface of the substrate and is believed to make the power distribution of the wave modes more symmetrical with respect to the axis of the waveguide thereby improving the efficiency of coupling between the waveguide and optical fibers. An apparent advantage of the buffer layer is an increase in the electrical conductivity of the surface layer region of the waveguide, which permits the ionized impurities in the waveguide to migrate until their charges are neutralized. As a result, electrical charges are prevented from accumulating in the waveguide, and perturbations of the waves caused by charge accumulation are avoided.

DETAILED DESCRIPTION OF THE PREFERRED EMBODIMENT

Figure 1:
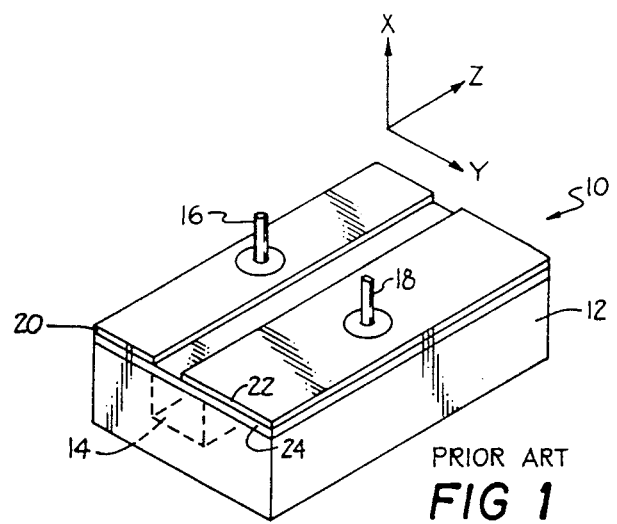
FIG. 1 is a diagrammatic perspective view of a prior art planar waveguide device.

In typical, known planar waveguide devices, one of which is identified generally by the reference numeral 10 in FIG. 1, a substrate 12 of high quality optical material, such as an x-cut or y-cut crystalline birefringent material, has a localized region of increased refractive index to define a waveguide 14 along the z-axis. The waveguide 14 can be formed by a number of processes, one of which is the in-diffusion of a transition metal, such as titanium. Electric potential is applied to the waveguide device 10 by leads 16 and 18 connected to electrodes 20 and 22, respectively, in the form of thin strips of metal deposited on or near the waveguide 14. Because of their position near the waveguide 14, the strips of metal comprising the electrodes 20 and 22 would attenuate the optical waves propagating through the waveguide 14 if no steps were taken to prevent it. For this reason, a thin layer 24 of high quality dielectric material, for example, about 0.1 micron of silicon dioxide, has ordinarily been provided by sputter deposition on the substrate 12 between the waveguide 14 and the electrodes 20 and 22.

Figure 2:
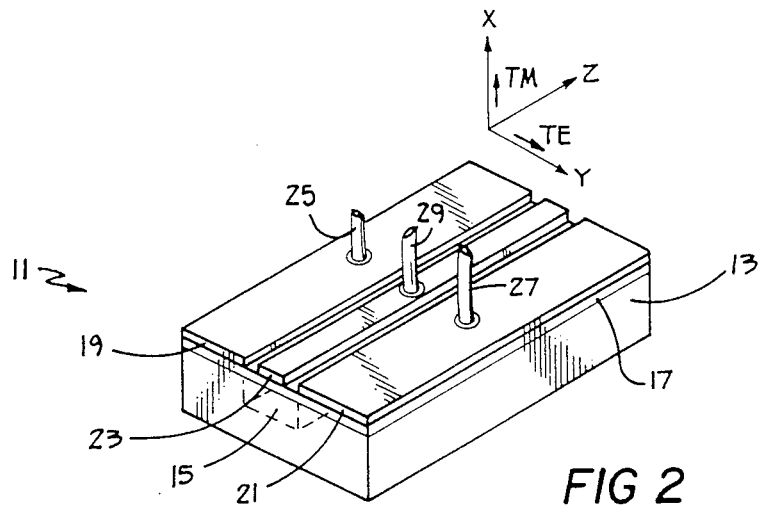
FIG. 2 is a diagrammatic perspective view of a planar waveguide device according to the present invention.

In planar waveguide devices according to the present invention, an exemplary example of which is a mode conversion device, identified generally by the reference numeral 11 in FIG. 2, a planar substrate 3 made of a crystalline birefringent material, such as lithium niobate (LiNbO$_3$) or lithium tantalate (LiTaO$_3$) is cut in the x- or y-crystalline directions and has a waveguide 15 formed within acceptable limits substantially parallel to the z-axis.

Atop the substrate 13 is a magnesium oxide buffer layer 17 that overlies it, including waveguide 15, throughout its width. On top of the buffer layer 17 are deposited three metallic electrodes, 19, 21 and 23 having leads 25, 27 and 29, respectively. Electrode 23 sits directly over waveguide 15, and electrodes 19 and 21 sit with their inboard edges adjacent the outboard edges of waveguide 15.

The channel waveguide 15 is formed by the indiffusion of the thin Ti stripe which is oriented parallel to the substrate z-axis. When waveguide 15 is put down parallel to the z-axis, TE and TM modes propagate with very nearly the same effective indices when both are well guided. This is the case since the Ti dopant increases the ordinary index of the material to faciltiate guiding for TE as well as TM modes. Mode conversion is realized by placing the pair of electrodes, 19 and 21, parallel to and on either side of the channel waveguide 15, as well as the third electrode 23 directly on top of it.

By applying a voltage to the first set, i.e., the electrode pair 19 and 21, along side the channel, the effective indices of orthogonally polarized TE and TM modes are forced to near equality by action of the r(12) and r(22) electrooptic coefficients. An additional voltage applied to the third electrode 23 on top of the waveguide 15, cause mode conversion between modes via the action of the r(61) coefficient.

It is important to realize that for this device, or others of similar functionality, to function efficiently, electrode set 1 must sustain a bias voltage. In many instances, it would be impractical to apply such D.C. bias fields since they may lead to degradation of mode conversion behavior as well as time dependent drift in the characteristics of the device. Here, these effects are minimized by burying the waveguide and symmetrizing its axial index distribution.

The technique used in this embodiment to depress the index of the channel waveguide surface to symmetrize the index distribution involves diffusion of a thin layer of magnesium oxide into the surface of the substrate following waveguide formation. The magnesium dopant acts as an index depressing agent and thereby cancels the effect of the titanium in raising the index of the guide surface. Waveguides were formed in this geometry by diffusing into the substrate 400 Å thick Ti stripes 3 microns in width at 1100° C. for 5 hours. Following this initial diffusion, the substrate was coated with 230 Å of Mg and returned to the furnace and oxidized at 900° C. for 4 hours in flowing wet oxygen. The resulting guide supported a single mode at a wavelength of 0.632 microns. The three-electrode pattern was subsequently placed over the buried channel. The center electrode was 5 microns in width and the gaps between center and outer electrodes was 5 microns. Electrodes were 12 mm in length.

The devices were tested for relative attenuation of the TE and TM modes prior to applying bias fields. No preferential loss in the TM mode was observed.

To examine the stability of the device as a mode converter, the guide was excited with TM polarized light and a bias of 14 volts was applied to the outer electrodes, 19 and 21. A 30 volt (pp) A.C. signal was applied to the center electrode. The throughput characteristic of the TE and TM modes were separately monitored.

It was found that for a thoughput power of roughly 10 microwatts at a wavelength of 0.632 micrometers, the mode conversion characteristic of the device remained stable within 12% over a period of 4 hours. At a throughput power of 100 microwatts, a 50% drift was observed over 5 minutes. At a wavelength of 0.817 micrometers, the conversion characteristic did not drift over this same time for similar power levels. The results indicate that photoconductivity plays a significant role in device stability. Similar devices fabricated with CVD deposited $SiO_2$ as a dielectric buffer layer displayed considerable drift (50%) over a few minutes for either 0.632 or 0.817 micron excitation.

Figure 3:
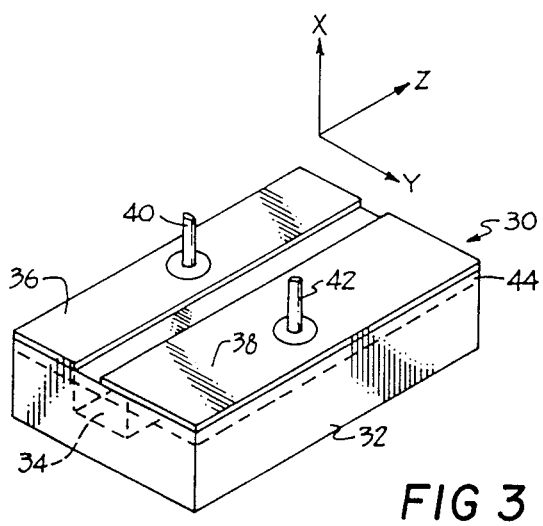
FIG. 3 is a diagrammatic perspective view of another planar waveguide device according to the present invention.

Another embodiment formed by proton exchange is the device designated by numeral 30 in FIG. 3. Here, a planar substrate 32 made of a crystalline birefringent material, such as lithium niobate ($LiNbO_3$) or lithium tantalate ($LiTaO_3$), is cut in the x- or y-direction and has a waveguide 34 formed substantially parallel to formed z-axis, although some slight angular deviation from the z-direction is permissible. Electrodes 36 and 38 are defined by thin strips of metal to which leads 40 and 42, respectively, are attached and are positioned on or near the waveguide 34. In contrast to the deposited layer of dielectric material of the prior art device of FIG. 1, however, a buffer layer 44 is provided directly in the substrate 32 to isolate the waveguide 34 from the metallic electrodes 36 and 38.

Figure 4:
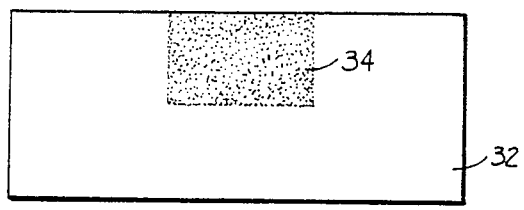
FIG. 4 is a diagrammatic end view of an intermediate product in the method of making the waveguide device of FIG. 3 according to the present invention.

The waveguide 34 is formed as a localized region of raised index of refraction in the shape of a channel by the in-diffusion of titanium or other transition metal in connection with appropriate masking of the substrate 32 to define an intermediate product, as can be seen from FIG. 4. The substrate 32 and its waveguide 34, having a raised index of refraction relative to the rest of the substrate, are subjected to a proton exchange, which, for the x-cut or y-cut material having the waveguide 34 substantially parallel to the z-axis, actually lowers the ordinary index of refraction of the material in a stratum at the surface. The stratum of reduced ordinary index of refraction defines the buffer layer 44 between the waveguide 34 and the metallic electrodes 36 and 38, which are later deposited on the buffer layer 44. The lowered ordinary index is effective in isolating the electromagnetic waves in the waveguide 34 from the electrodes 36 and 38 because both the TE and TM modes "see", that is, they are influenced by, the ordinary index of refraction in the crystalline birefringent material.

Figure 5:
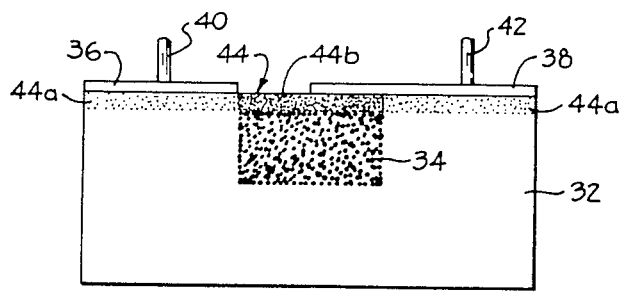
FIG. 5 is an end view of the waveguide device of FIG. 3.

The ion exchange, or proton exchange, takes place by immersing the substrate 32 in a bath of melted benzoic acid, for example, at 250° C. for three minttes to deplete the lithium from a stratum approximately 0.3 microns thick at the surface and thereby form the buffer layer 44, as can be seen from FIG. 5. The ordinary index of refraction of portions 44a of the buffer layer 44 lying in the substrate 32 but outside the region exposed to the titanium in-diffusion is reduced below the ordinary index of the rest of the substrate by approximately 0.02. Approximately the same reduction in ordinary index occurs in a portion 44b of the buffer layer 44 lying above the waveguide 34 and is greater than the increase in index introduced to the substrate 32 by the in-diffusion of titanium, thereby burying the waveguide 34 below the surface of the substrate. The burying of the waveguide 34 is believed to help make the modal power distribution of the waves more symmetrical with respect to the axis of the waveguide 34 and, thereby, improve the efficiency of coupling between the waveguide and optical fibers. It is also believed that the proton exchange process increases the electrical conductivity of the surface of the waveguide 34, thereby making it easier for the ionized impurities in the substrate to migrate until neutralized and avoiding the perturbations of the visible wavelengths by charge accumulation near the waveguide.

Thus, it will be appreciated that as a result of the present invention, highly effective buffer layers and methods for their fabrication are provided for preventing electrodes from attenuating electromagnetic waves in a planar waveguide device. Modifications in the illustrated embodiments may be made to provide waveguide devices having varying configurations and functions. It will be apparent to those skilled in the art from the disclosure that additional modifications and/or changes may be made in the illustrated embodiments without departure from the invention. Accordingly, it is expressly intended that the embodiments shown are illustrative only, and that the true spirit and scope of the present invention will be determined by reference to the appended claims.

What is claimed is:

1. An electrooptical mode converter, said mode converter comprising:

a planar substrate fabricated of either an x-cut or y-cut crystalline birefringent material having a crystallographic z-axis corresponding to it optic axis, said substrate having formed therein a high index channel for waveguiding that is parallel to said z-axis and has effective indices of refraction for TE and TM modes of propagation that are nearly the same, said channel having a first longitudinally extending region that has a higher index of refraction than that of said substrate and is surrounded on three sides by said substrate and a second thinner longitudinally extending dielectric region overlying said first region and having an index of refraction substantially the same as that of said substrate to bury said channel beneath the surface of said substrate for purposes of optically isolating it and symmertrize its axial index distribution so that said TE and TM modes propagate along said z-axis with approximately the same phase velocity, said first region being formed by in-diffusion of metal ions and said second region being formed on top of it by either in-diffusing index lowering ions into it or proton exchanging ions to lower its ordinary index; and at least a pair of electrodes placed on said surface of said substrate parallel with said channel with at least part of one of said electrodes overlying said channel, said second region of said substrate further acting with respect to said part of said electrode as a buffer layer, said electrodes being operative by application of a D bias voltage to force the effective indices of said TE and TM modes to near equality and by application of an AC voltage to cause conversion between said modes.

2. The mode converter of claim 1 wherein said substrate crystalline birefringent material is selected from the group including lithium noibate and lithium tantalate.

3. The mode converter of claim 1 wherein said second region is formed by in-diffusing Magnesium ions into the top of said first region.

4. The mode converter of claim 1 wherein said first region of said substrate is formed by in-diffusing Ti ions into said substrate.

* * * * *